July 26, 1966  D. P. SEIP, JR., ETAL  3,262,595
LIFT TRUCK CLAMP ATTACHMENT
Filed Sept. 27, 1963  3 Sheets-Sheet 1

INVENTORS:
DONALD P. SEIP JR.
DONALD M. MACKAY
BY
John A. McKinney
ATTORNEY

July 26, 1966   D. P. SEIP, JR., ET AL   3,262,595
LIFT TRUCK CLAMP ATTACHMENT
Filed Sept. 27, 1963   3 Sheets-Sheet 2
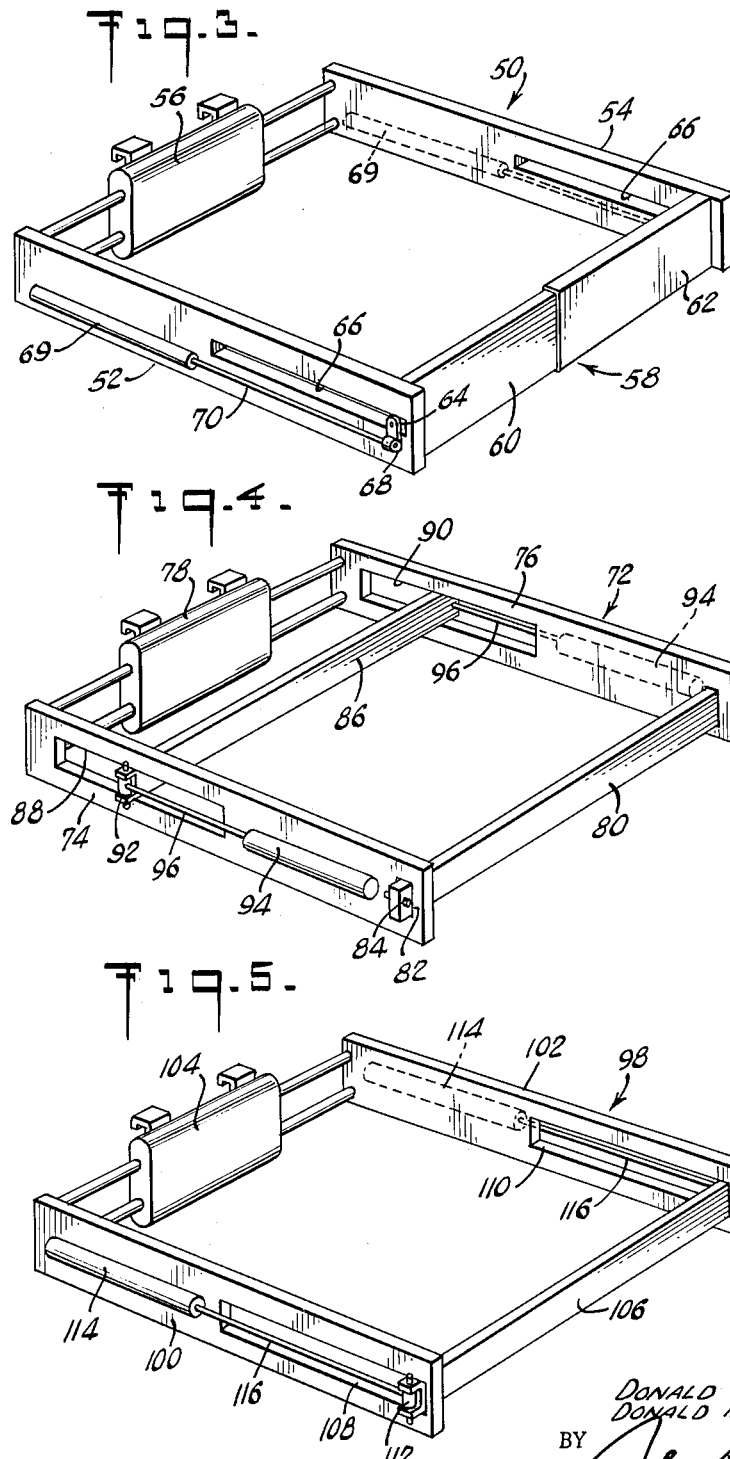
INVENTORS:
DONALD P. SEIP JR.
DONALD M. MACKAY.
BY 
ATTORNEY

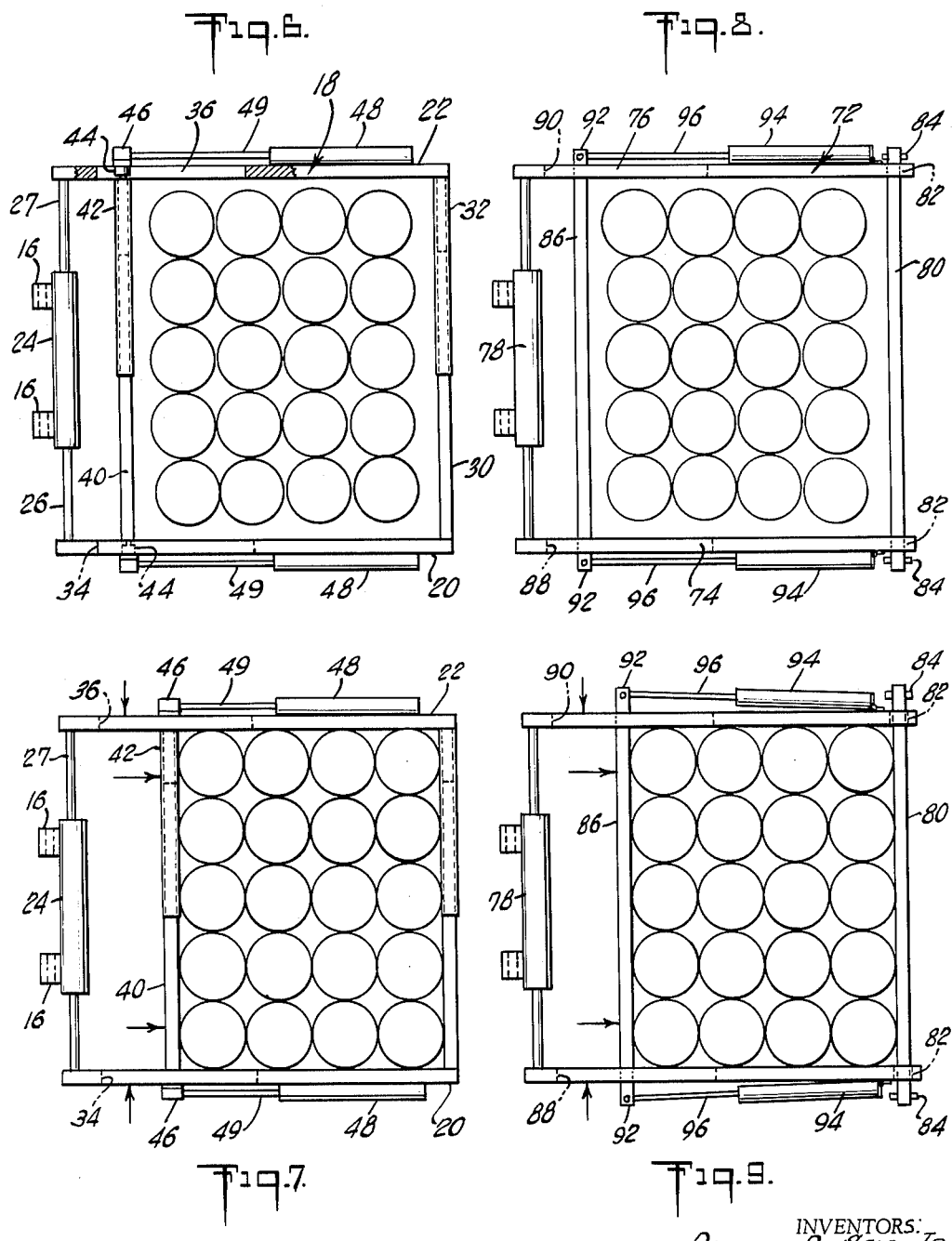

UNITED STATES PATENT OFFICE

United States Patent Office 3,262,595
Patented July 26, 1966

3,262,595
LIFT TRUCK CLAMP ATTACHMENT
Donald P. Seip, Jr., Somerville, and Donald M. MacKay, Plainfield, N.J., assignors to Johns-Manville Corporation, New York, N.Y., a corporation of New York
Filed Sept. 27, 1963, Ser. No. 312,173
12 Claims. (Cl. 214—653)

This invention relates to a clamp attachment for a lift truck, and more particularly, it relates to a clamp attachment adapted to grasp vertically arranged cylindrical objects.

Lift trucks are employed extensively in moving products from the end of a manufacturing line to a storage area, and again from the storage area to a carrier for shipment. Lift trucks utilizing vertically movable forks for lifting a large article or a pallet supporting a number of articles are well known, as are trucks utilizing two horizontally extending arms movable both toward and away from each other and in a vertical direction for grasping and lifting articles. These arrangements perform satisfactorily when used to carry cartons or flat sided objects, but difficulties are encountered in lifting cylindrical objects, such as rolls of roofing or flooring material, which are commonly left standing on end both after their manufacture in the plant and during storage.

Present practices require such rolls to be supported on a pallet, which is transported by a fork lift truck to a storage area where the rolls and pallet are stored. Not only does the use of pallets take up a considerable amount of time on the part of the workmen involved in storing and loading the goods, but it requires an extensive inventory of pallets which must be replenished continually, due to loss during shipment or because purchasers of the goods fail to return the pallets. Lift trucks provided with movable arms, as described above, cannot be utilized to lift a group of rolls because when the arms exert pressure on the rolls, there is a tendency for the rolls to be forced out of the group toward the open gap between the ends of the arms. This is due to the compressive forces exerted by the rolls on adjacent rolls as the arms of the lift truck are moved toward each other in a clamping operation. This phenomenon is not peculiar to the particular to the particular products mentioned, but is even more pronounced when lifting metal drums, pipes, or other cylindrical objects which are more rigid than rolls of roofing or flooring material.

Various lifting arrangements have been employed in the past in attempts to solve this problem, but they have been limited, for the most part, to arrangements adapted to lift only one object at a time. Constructions have been developed for lifting drums by engaging end flanges on the drums with hooks mounted for relative movement on a single arm. Another arrangement utilizes flexible arms mounted for movement toward and away from each other, the arms conforming to the periphery of the drum or other cylindrical object. A further arrangement employs articulated arms adapted to be pivoted toward each other to hold irregularly shaped objects. None of these arrangements, however, is adapted to lift and securely hold one or more vertically arranged cylindrical objects, while preventing the objects from being forced out of the lifting device.

An object of the present invention is to provide a lift truck attachment for grasping and lifting a plurality of vertically arranged cylindrical objects.

Another object is to provide such an attachment which is simple in construction and readily adapted to be attached to the elevator portion of a lift truck.

A further object is to provide a lift truck attachment for grasping cylindrical objects, which attachment does not require the use of a pallet.

Briefly, the present invention involves a clamping attachment adapted to be connected to the elevator portion of a lift truck, and comprises a pair of spaced arms mounted for movement toward and away from each other and connected by a third arm mounted for reciprocal movement along the length of the pair of arms. The third arm is arranged to permit the pair of arms to be moved, which arrangement may be accomplished by forming the third arm from a plurality of telescoping sections, or by utilizing an arm of fixed length mounted in suitable slots in the pair of arms, thereby enabling the pair of arms to slide along the length of the third arm. According to one arrangement, the third arm is located adjacent the front ends of the pair of arms, and a load is enclosed by the pair of arms, the third arm, and a plate or motor connecting the back ends of the pair of arms. In another arrangement, the third arm is located adjacent the back ends of the pair of arms, and a load is enclosed by the pair of arms, the third arm, and a fourth arm mounted in a manner similar to the third arm, but fixed adjacent the front ends of the pair of arms.

Both arrangements completely enclose the load to be lifted and preclude any cylindrical objects, or other objects having curved surfaces, from slipping out of the load. The attachment is economical since it has relatively few component parts, and readily can be attached to the front elevator portion of existing lift trucks.

The nature of the invention will be more fully understood and other objects may become apparent when the following detailed description is considered in connection with the accompanying drawing wherein:

FIG. 3 is a pictorial representation of a modified arrangement of the clamping attachment shown in FIG. 2;

FIG. 4 is a pictorial representation of another modified clamping attachment, wherein the relative locations of the clamping arms are similar to those of the attachment shown in FIG. 2;

FIG. 5 is a pictorial representation of a modified arrangement of the attachment shown in FIG. 4, wherein the relative locations of the clamping arms are similar to those of the attachment shown in FIG. 3.

FIG. 6 is a top plan view of the attachment shown in FIG. 2, illustrating it in open condition with respect to a load of cylindrical objects;

FIG. 7 is a top plan view similar to FIG. 6, but showing the attachment in closed condition;

FIG. 8 is a top plan view of the attachment shown in FIG. 4, illustrating it in open condition with respect to a load of cylindrical objects; and FIG. 9 is a top plan view similar to FIG. 8, but showing the attachment in closed condition.

Figure 1:
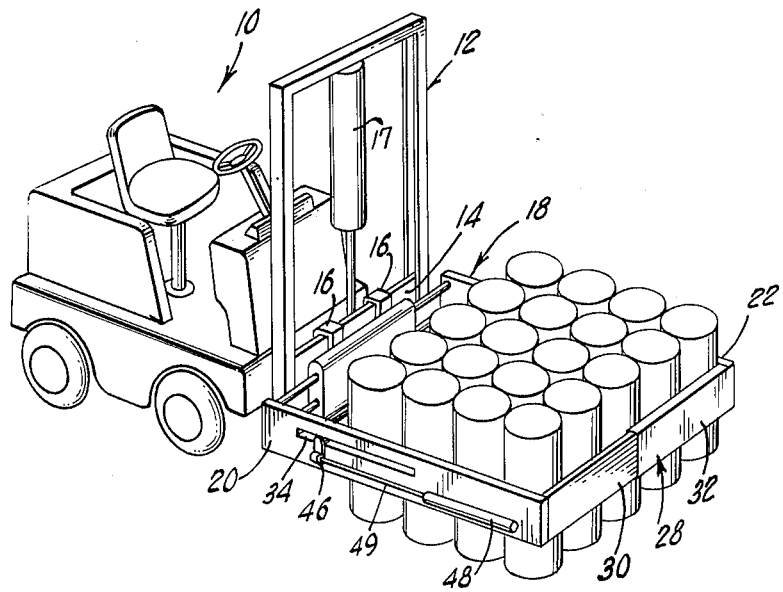
FIG. 1 is a pictorial representation of a fork lift truck with the clamping arrangement of the present invention attached thereto.

Referring to FIG. 1 of the drawing, a fork lift truck 10, of a design well known in the art, carries an elevator support frame 12 in which an elevator plate 14 is adapted for vertical movement upon actuating of power cylinder 17. Attached to the elevator plate 14 by hooks 16 or other suitable clamping means is the clamping attachment 18 of the present invention.

Figure 2:
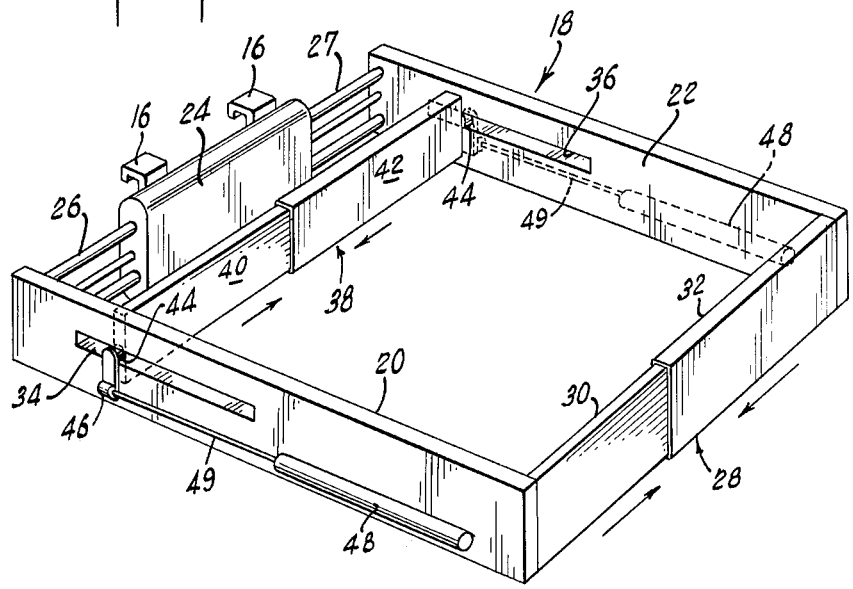
FIG. 2 is a pictorial representation of a preferred arrangement of the clamping attachment of the present invention.

As shown in FIG. 2, the attachment 18 comprises a pair of spaced, substantially parallel arms 20 and 22 connected at their back ends, which are the ends closest to the lift truck, by a bank of power cylinders 24. The cylinders 24 are vertically stacked and arranged alternately so that the piston rods 26, 27 of adjacent cylinders connect opposite arms 20 and 22. Although this is the preferred cylinder arrangement, it is obvious that other arrangements could be utilized while still providing the function of connecting and moving the arms 20 and 22 toward and away from each other. The structure thus far described is well known in the art, and is commonly employed to lift flat objects presenting planar surfaces, such as rectangular cartons or boxes.

According to the present invention, the front ends of the arms 20 and 22 are connected by an arm 28 having telescoping sections 30 and 32 secured to the arms 20 and 22 respectively, as by welding or other suitable means. Extending from a point adjacent the back ends of the arms 20 and 22, to a point intermediate the ends thereof are slots 34 and 36, respectively, in which an arm 38, comprised of telescoping sections 40 and 42, slidably mounted. Rollers 44 may be attached to each end of the arm 38 and mounted in the slots 34 and 36 to facilitate the sliding movement of the arm 38. A pin or bracket 46, the height of which is greater than the width of the slots 34 and 36, is connected to each end of arm 38 and is located adjacent the outer surface of the adjacent arm 20 or 22 to prevent the arm 38 from becoming disengaged from the arms 20 and 22 when they are moved away from each other. Power cylinders 48, mounted on the outer surfaces of the arms 20 and 22 by any suitable means, are connected to the bracket portions 46 by piston rods 49.

Referring to FIGS. 1, 2, 6, and 7, to lift a load of cylindrical or other shaped objects, a fork lift truck carrying the clamping attachment 18 is moved to a position adjacent the objects, and the clamping attachment is lowered to completely surround the objects by the arms 20, 22, 28, and 38. The relationship between the attachment and the load at this point is illustrated in FIG. 6. Power cylinders 24 and 48 are then actuated, causing the arms 20 and 22 to move toward each other, thereby closing the telescoping arms 28 and 38, and causing the arm 38 to move toward the arm 28 until the clamping arms are firmly in contact with the load. The attachment is shown in this closed condition in FIG. 7. The attachment is raised upon actuation of the cylinder 17, elevating the load, and the truck is driven to the area where the load is to be deposited. The attachment is lowered upon actuation of cylinder 17 in the opposite direction, and the cylinders 24 and 48 are then actuated in the reverse direction, thus releasing the load from the clamping arms and assuming the condition shown in FIG. 6 once again. The attachment then is raised until it clears the top of the load, and the truck is free to move to another location.

A number of the structural features shown in the embodiment of FIG. 2 may be modified without materially affecting the operation of the clamping attachment. As previously mentioned, the specific arrangement of the power cylinders 24 need not be as indicated in the drawing. It is not necessary that the cross section of the telescoping arms 28 and 38 be rectangular, as shown, since tubular arms could be employed, although such arms do not possess a load engaging area as large as that of rectangular arms. In addition, various arrangements of movably mounting the arm 38 with respect to the arms 20 and 22 may be provided. For example, instead of providing the arms 20 and 22 with slots, the inner surfaces thereof may be provided with a track portion in which a suitable extension of the arm 38 may ride, or the extremities of the arm 38 may be provided with hooks which fit over the upper and lower edges of the arms 20 and 22 so that the latter pair of arms themselves would function as a track.

Referring to FIG. 3, a modified clamping attachment indicated at 50 comprises spaced parallel arms 52 and 54 connected at their back ends by a bank of power cylinders 56. A telescoping arm 58 comprised of telescoping sections 60 and 62 is slidably mounted in slots 66 extending from the front ends of the arms 52 and 54 to a point intermediate thereof. As in the case of the arm 38 of the structure shown in FIG. 2, the ends of the arm 58 are provided with suitable rollers 64 to facilitate movement in the slots, and pin or bracket means 68 are provided on the extremities of the arm 58 for preventing the arm from becoming disengaged from the arms 52 and 54. Power cylinders 69 are mounted on the outer surfaces of the arms 52 and 54 adjacent the back ends thereof, and are connected by piston rods 70 to the bracket portions 68 to effect reciprocal movement of the arm 58 in the slots 66.

In operation, the attachment 50 functions in a manner similar to the attachment 18 of FIG. 2, in that it is first lowered over the load to be lifted, and upon actuation of the cylinders 56 and 69, the arms 52, 54, and 58 are moved to engage the load with sufficient pressure to maintain the load in the grasp of the attachment as it is subsequently lifted. In this arrangement, the bank of cylinders 56 provides one of the pressure surface against which the load is engaged; or, in other words, the bank of cylinders assumes the function of the fixed arm 28 in the arrangement of FIG. 2. It should be evident that a fixed arm similar to the arm 28 of the FIG. 2 arrangement could be provided adjacent the bank of power cylinders 56, if for any reason it were not desirable for the bank of cylinders 56 to perform this function.

The arrangement of FIG. 3 permits the load to be carried close to the back end of the attachment, thereby resulting in a more balanced load than is possible with the attachment shown in FIG. 2. But because the load is not as close to the outer ends of the arms 52 and 54, as it would be in the FIG. 2 arrangement, it is not possible to drop the load as close to a wall surface as can be done by the structure of FIG. 2.

Another modified attachment is shown in FIG. 4, wherein the clamping attachment 7 comprises spaced parallel arms 74 and 76 connected at their back ends by a bank of power cylinders 78. An arm 80 is mounted in slots 82 in the front ends of the arms 74 and 76, the slots having slightly larger dimensions than those of the arm 80 to permit the arms 74 and 76 to slide thereover but to hold the arm 80 stationary with respect to relative movement along the lengths of the arms 74 and 76. Pins or brackets 84, the lengths of which are greater than the widths of the slots 84, are connected to the extremities of the arm 80 and are located adjacent the outer surfaces of the arms 74 and 76 to prevent them from moving off the ends of the arm 80 during movement of the arms 74 and 76 away from each other. Another arm 86 is mounted in slots 88 and 90 in the arms 74 and 76, respectively, the slots extending from points adjacent the back ends of the arms 74 and 76 to points intermediate the ends thereof. The widths of the slots 88 and 90 are slightly greater than the width of the arm 86 so that it can have relative movement with respect to the arms 74 and 76 in directions both parallel and transversely thereof. If desired, ball bearings or lubricating means may be provided on the edges of the slots 88 and 90 or on the edges of the arm 86 to facilitate sliding movement thereof in the slots. Brackets 92, connected to the extremities of the arm 86, are mounted adjacent the outer surfaces of the arms 74 and 76 and are pivotally connected to power cylinders 94 by piston rods 96, the power cylinders being hinged to the arms 74 and 76 to permit inward movement of the arms.

In operation, the attachment 72 functions in the same manner as the clamping attachment shown in FIG. 2, in that the parallel arms are moved toward each other by the cylinders 78, and the arm 86 is moved toward the fixed arm 80 by the cylinders 94. This action is illustrated in FIGS. 8 and 9, which show the attachment in open and closed conditions, respectively. This arrangement permits greater rigidity of the transverse arms 80 and 86 than can be attained by the telescoping arms 28 and 38 of the attachment shown in FIG. 2, but it also requires that the widths of the slots 88 and 90 be greater than the widths of the slots 34 and 56 in the embodiment shown in FIG. 2, thus requiring, in some instances perhaps, the spaced parallel arms to have a greater width than in the embodiment of FIG. 2.

The attachment 98 shown in FIG. 5 is a modification of the attachment of FIG. 4, and it comprises parallel arms 100 and 102 spaced from each other and connected at their back ends by a bank of power cylinders 104. An arm 106 is slidably mounted in slots 108 and 110 formed in arms 100 and 102, respectively, the slots extending from a point adjacent the front ends of the arms 100 and 102 to a point intermediate the ends thereof. Pins or brackets 112 are provided on the extremities of the arm 106 and are pivotally connected to power cylinders 114 by piston rods 116 for the same purposes as the related structure described in connection with FIG. 4. The cylinders 114 are pivotally connected to the parallel arms 100, 102 in the same manner as in the FIG. 4 structure.

In operation, the clamping attachment 98 functions in the same manner as the attachment shown in FIG. 3. As described in connection with the structure of FIG. 4, the transverse arm is more rigid than the telescoping arms, but it requires relatively wide slots in the parallel arms, which may require these latter arms to be wider than in the arrangements utilizing telescoping arms.

Neither the fluid lines to the power cylinders nor the control system for actuating the power cylinders has been shown, since the design of these features is well within the scope of one skilled within the art, and various arrangements may be provided to perform these functions.

It should be apparent from the foregoing description that the clamping attachment of the present invention, although simple in structure and in operation, provides a decided improvement over the clamping arrangements of the prior art, and enables cylindrical objects to be readily grasped and moved by a fork lift truck.

It is to be understood that other variations and modifications of the present invention may be made without departing from the spirit of the invention. It also is to be understood that the scope of the invention is not to be interpreted as limited to the specific embodiments disclosed herein, but only in accordance with the appended claims, when read in the light of the foregoing disclosure.

What we claim is:

1. A clamping device for handling a load and for use with a lift truck comprising,
   (a) a pair of substantially parallel spaced arms mounted for movement toward and away from each other,
   (b) motor means for moving the arms,
   (c) a clamping surface extending transversely of the arms,
   (d) a third arm connecting the pair of arms and being mounted for reciprocal movement toward and away from the clamping surface in a direction substantially parallel to the pair of arms,
   (e) the pair of arms, the third arm, and the clamping surface forming the sole support for a load,
   (f) motor means for moving the third arm,
   (g) the third arm being comprised of a plurality of telescoping sections, and
   (h) means on the device for connecting the device adjacent one end of the pair of arms to a lift truck.

2. A clamping device as recited in claim 1, wherein the motor means for moving the pair of arms is located adjacent said one end of the pair of arms, and the third arm is movable to a position adjacent the opposite ends of the pair of arms.

3. A clamping device as recited in claim 2, wherein the motor means for moving the third arm is mounted on at least one of the arms of the pair of arms, and the motor means for moving the pair of arms and the third arm are fluid actuated.

4. A clamping device as recited in claim 1, wherein the third arm is movable to a position adjacent said one end of the pair of arms, and the clamping surface comprises a fourth arm connecting the pair of arms adjacent their opposite ends, the fourth arm being comprised of a plurality of telescoping sections.

5. A clamping device as recited in claim 4, wherein the motor means for moving the pair of arms and the third arm are fluid actuated.

6. A clamping device for use with a lift truck comprising,
   (a) a pair of substantially parallel spaced arms mounted for movement toward and away from each other,
   (b) each of said arms having an elongated slot therein,
   (c) motor means for moving the arms,
   (d) a third arm connecting the pair of arms and being mounted for reciprocal movement toward and away from a clamping surface in a direction substantially parallel to the pair of arms,
   (e) motor means for moving the third arm,
   (f) the third arm being mounted in the slots to permit the pair of arms to slidably move along the third arm,
   (g) means on the ends of the third arm preventing said ends from becoming disengaged from the pair of arms, and
   (h) the device being adapted to be connected to a lift truck adjacent one end of the pair of arms.

7. A clamping device as recited in claim 6, wherein the motor means for moving the pair of arms is located adjacent said one end of the pair of arms, and the third arm is movable to a position adjacent the opposite ends of the pair of arms.

8. A clamping device as recited in claim 7, wherein the motor means for moving the third arm is mounted on at least one of the arms of the pair of arms, and the motor means for moving the pair of arms and the third arm are fluid actuated.

9. A clamping device as recited in claim 6, wherein the third arm is movable to a position adjacent said one end of the pair of arms, each of the arms in the pair of arms having a slot adjacent their opposite end, and the clamping surface comprises a fourth arm connecting the pair of arms adjacent their opposite ends and being mounted in the latter slots to permit the pair of arms to slidably move along the fourth arm, and means on the ends of the fourth arm preventing said latter ends from being disengaged from the pair of arms.

10. In combination with a lift truck, a clamping device comprising,
    (a) a pair of spaced arms,
    (b) each having a front end and a back end,
    (c) fluid cylinder means connecting the arms adjacent the back ends thereof for moving the arms toward and away from each other,
    (d) means adjacent the fluid cylinder means connecting the device to the lift truck,
    (e) each arm having an elongated slot therein,
    (f) a third arm connecting the pair of arms,
    (g) means slidably mounting the third arm in the slots for movement toward a clamping surface,
    (h) fluid cylinder means mounted on at least one of the arms of the pair of arms and connected to the third arm for reciprocably moving the third arm in the slots, and
    (i) the third arm comprising a plurality of telescoping sections.

11. In combination with a lift truck, a clamping device comprising,
    (a) a pair of spaced arms,
    (b) each arm having a front end and a back end,
    (c) fluid cylinder means connecting the arms for moving the arms toward and away from each other,
    (d) means adjacent the fluid cylinder means connecting the device to the lift truck,
    (e) each arm having an elongated slot therein,
    (f) a third arm connecting the pair of arms, (g) the ends of the third arm extending through the elongated slots in the pair of arms, (h) the widths of the slots being at least as great as the width of the third arm, (i) means on the ends of the third arm preventing the pair of arms from being disengaged from the third arm, and (j) fluid cylinder means mounted on at least one of the arms of the pair of arms and connected to the third arm for reciprocably moving the third arm in the slots toward and away from a clamping surface.

12. A clamping device for use with a lift truck comprising, (a) a pair of spaced arms mounted for movement toward and away from each other, (b) means for thus moving the arms, (c) a third arm, (d) a fourth arm, (e) the third arm connecting the pair of arms and being mounted for movement along the lengths of the pair of arms toward the fourth arm, (f) the fourth arm also connecting the pair of arms, (g) means for thus moving the third arm, (h) means causing the portion of the third arm extending between the pair of arms to remain substantially equal in length to the distance between the pair of arms during relative movement of the pair of arms, (i) means for causing the portion of the fourth arm extending between the pair of arms to remain substantially equal in length to the distance between the pair of arms during relative movement of the pair of arms, and (j) means on the device for connecting the device adjacent one end of the pair of arms to a lift truck.

References Cited by the Examiner

UNITED STATES PATENTS

| | | | |
|---|---|---|---|
| 515,986 | 3/1894 | Barnard | 296—114 |
| 2,323,141 | 6/1943 | Lancaster | 144—288 |
| 2,841,302 | 7/1952 | Reisman et al. | 214—621 |
| 2,866,504 | 12/1958 | Syers. | |
| 3,008,618 | 11/1961 | Watts et al. | 144—288 |

FOREIGN PATENTS 36,881 12/1926 Denmark.

GERALD M. FORLENZA, *Primary Examiner.*

MORRIS TEMIN, *Examiner.*

R. B. JOHNSON, *Assistant Examiner.*